W. E. BRILLHART.
BOLT CLAMP.
APPLICATION FILED AUG. 27, 1921.

1,420,519.

Patented June 20, 1922.

Inventor
Walter E. Brillhart,
By
Attorney

UNITED STATES PATENT OFFICE.

WALTER E. BRILLHART, OF DALLASTOWN, PENNSYLVANIA.

BOLT CLAMP.

1,420,519.  Specification of Letters Patent.  Patented June 20, 1922.

Application filed August 27, 1921. Serial No. 495,851.

*To all whom it may concern:*

Be it known that WALTER E. BRILLHART, a citizen of the United States of America, residing at Dallastown, in the county of York and State of Pennsylvania, has invented new and useful Improvements in Bolt Clamps, of which the following is a specification.

The object of the invention is to provide simple and efficient means for holding a bolt during the tightening or removal of the nut and for backing the bolt out of the opening in which it is fitted after the nut has been removed, the device being provided with means whereby it may be engaged with any adjacent object such as may be found in connection with a plow or other implement or apparatus, the device, however, being especially designed with reference to use in connection with plows, cultivators and wagons; and with these objects in view the invention consists in a construction and combination of parts of which a preferred embodiment is shown in the accompanying drawings, wherein:

Figure 1:
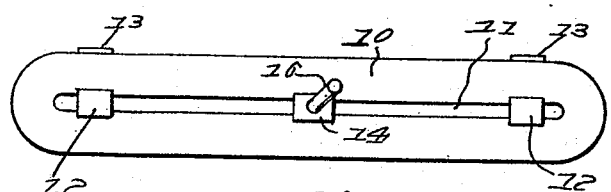
Figure 1 is a plan view.
Figure 2:
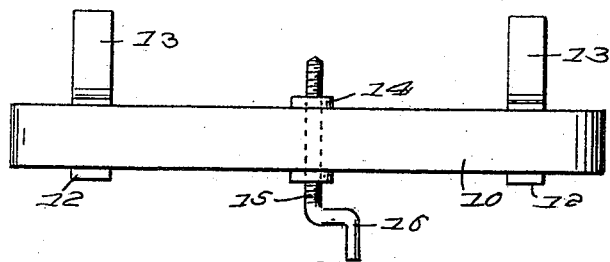
Figure 2 is a side view of a clamp embodying the invention.
Figure 3:
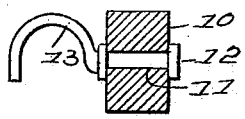
Figure 3 is a sectional view of the same taken in the plane of one of the holding elements.

The clamp consists essentially of a bar 10, adapted to be made of any suitable dimensions to suit the particular purpose, if any, for which it may be designed, and having a longitudinal guide slot 11 in which are fitted slides 12 carrying holding elements 13 and a slide 14 carrying a clamping bolt 15.

In the construction illustrated the holding elements consist of hooks having a swivel as well as a sliding connection with the bar to adapt them to be faced in any desired direction for engagement with any suitable adjacent object for the purpose of securing the bar in a fixed position, and the clamping bolt which is also movable longitudinally of the bar to adapt it to the position of the bolt which is to be operated is designed to bear against the head of the bolt to secure the bolt against turning movement while the nut is being either tightened or loosened, or can be placed against the end of the nut after the bolt has been removed for the purpose of backing the nut out of the opening through which it extends. The bolt is provided with a suitable operating handle or crank 16 to facilitate the operation thereof and in repair work and the substitution or replacement of plow shovels or like soil working implements or bits the device will be found convenient and serviceable as a means of facilitating the application and removal of the bolts.

Having described the invention, what is claimed as new and useful is:—

1. A bolt clamp having a bar carrying a plurality of slides, a clamping bolt adjustably mounted upon an intermediate slide and retaining elements carried by slides at opposite sides of the plane of the clamping bolt, said retaining elements having a swivel connection with the slides upon which they are mounted.

2. A bolt clamp having a bar carrying a plurality of slides, a clamping bolt adjustably mounted upon an intermediate slide and retaining elements carried by slides at opposite sides of the plane of the clamping bolt, said retaining elements having a swivel connection with the slides upon which they are mounted and consisting of hooks for engagement with adjacent objects.

3. A bolt clamp having a bar carrying a plurality of slides, a clamping bolt adjustably mounted upon an intermediate slide and retaining elements carried by slides at opposite sides of the plane of the clamping bolt, the bar being provided with a guide slot for the reception of said slides.

In testimony whereof he affixes his signature.

WALTER E. BRILLHART.